D. A. SUTHERLAND.

Assignor to himself and Joseph N. Smith.

PRESSER-FEET FOR SEWING-MACHINES.

No. 7,558. Reissued March 13, 1877.

Witnesses
Ovella Dick.
E. E. Masson.

Inventor:
Daniel A. Sutherland
by Pollok & Bailey
his attys.

THE NORRIS PETERS CO., PHOTO-LITHO., WASHINGTON, D. C.

UNITED STATES PATENT OFFICE.

DANIEL A. SUTHERLAND, OF LYNN, MASSACHUSETTS, ASSIGNOR TO HIMSELF AND JOSEPH N. SMITH, OF SAME PLACE.

IMPROVEMENT IN PRESSER-FEET FOR SEWING-MACHINES.

Specification forming part of Letters Patent No. 177,296, dated May 9, 1876; reissue No. 7,558, dated March 13, 1877; application filed January 16, 1877.

*To all whom it may concern:*

Be it known that I, DANIEL A. SUTHERLAND, of Lynn, Essex county, Massachusetts, have invented new and useful Improvements in Presser-Feet of Sewing-Machines, of which the following is a specification:

The presser-foot in which my invention is comprised is designed to be used in sewing stay-strips or saddle-pieces to the closing-seams of boots and shoes.

The stay-strip or saddle-piece, as is well known, extends longitudinally of and over the seam to which it is applied, and is secured by two parallel lines of stitching—one on each side of the seam. The stay-strip is thus divided into three parts—a central part, which forms a saddle for the seam, and two side parts, by which the saddle proper is sewed to the material in which the seam is formed. In order, therefore, to properly guide the stay-strip during the sewing operation, it becomes necessary to employ a presser-foot the under face of which is formed to correspond with the divisions of the stay-strip—viz., with a longitudinal recess of a width sufficient to admit the passage of the stay-strip, this recess being formed of a central recession, which receives the saddle part proper of the stay-strip, and of side recessions, one on each side of the central recession, which receive the portions of the stay which intervene between the lines of stitching and adjoining edges of the strip. It is in a presser-foot thus formed that my invention consists.

A stay-piece has been formed of a strip which has been sewed to the seam, either in an unfolded state—*i. e.*, consisting of a single thickness of material—or in a folded condition.

My invention is adapted for use with either kind of a stay-piece. In order to indicate the wide range of its application I have represented it in the accompanying drawing in conjunction with devices by means of which, if a folded stay-strip is desired, said strip may be fed to the presser-foot, and folded as it passes under the foot to the needle.

Figure 1:
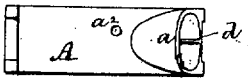
Figure 2:
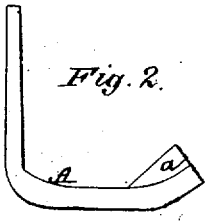
Figure 3:
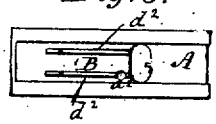
Figure 5:
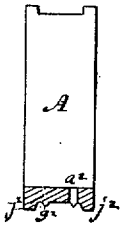
Figure 6:
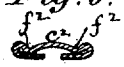
Figure 4:
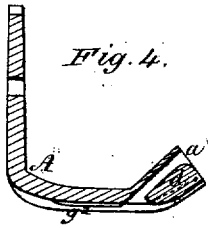
Figure 7:
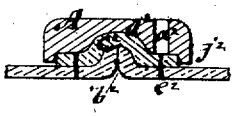

Figure 1 is a top view of the presser-foot. Fig. 2 is a side elevation, Fig. 3 is a bottom view, Fig. 4 is a longitudinal vertical section, and Fig. 5 is a transverse vertical section, of the same. Fig. 6 represents, on an enlarged scale, a transverse section of a folded seam-stay.

The presser-foot A, for the reasons hereinbefore stated, is formed with a longitudinal recess in its under or acting face, which recess is divided into, or made up of, three recessions—a central recession, B, which receives the saddle part proper of the stay-piece, (*i. e.*, the central part included between the points $f^2$ $f^2$ in Fig. 6,) and the two lateral recessions $d^2$, one on each side of the central recession, which receive the parts of the stay intervening between its longitudinal edges and the adjoining points or lines $f^2$. The needle-hole in the presser-foot is marked $a^2$ In some instances it is desirable to form in the stay-strip channels or creases to receive the stitches, and allow them to sink below the level of the face of the strip, in order to protect them from wear. This can be effected by forming in the recess, on the under side of the presser-foot, longitudinal parallel ribs or splines $g^2$, which extend between the central recession and side recessions. These ribs will have the effect of forming the channels at the time of sewing. Said channels may, however, be formed in the strip before the sewing operation. In either case, however, the material passing under the presser-foot will, by the recessions and the ribs, be guided in the right path under the needle, so that the stitches will be laid in the bottom of the grooves or creases.

The sides $j^2$ of the recess embrace the edges of the stay-strip, serving not only to prevent lateral spreading or displacement of the strip, but to act as an additional means of guiding the material through the machine.

If it is desired to fold the strip as it passes under the presser-foot, there may be combined with the foot a tapering folding mouth, *a*, which opens into the recess in the under side of the foot. Within the folding mouth is a thin partition, *d*, that extends up a short distance from the bottom of the mouth, and is arranged longitudinally thereon. A stay-piece of the proper width, once introduced into and drawn through the folder, and pressed upon by the foot, will assume the form shown in cross-section in Fig. 6.

Having described my invention, I shall state my claim as follows:

1. A sewing-machine presser-foot for use in sewing stay or saddle pieces to seams, the under or acting face of which is formed with a recess, consisting of a longitudinal central recession to receive the saddle part of the stay-strip, and of side recessions to contain the part of the strip intervening between its central saddle part and its edges, substantially as set forth.

2. The presser-foot formed with central and side recessions, as described, and with parallel ribs intervening between the central recession and side recessions, as set forth.

3. A sewing-machine presser-foot provided with recessions and ribs on the under side of the foot, and a folding mouth and a partition on the upper side of the foot, substantially as and for the purposes set forth.

D. A. SUTHERLAND.

Witnesses:
F. CURTIS,
W. E. BOARDMAN.